United States Patent [19]

Freeman

[11] Patent Number: 5,227,770
[45] Date of Patent: Jul. 13, 1993

[54] ELECTRONIC BOUNDARY GENERATION

[75] Inventor: Stephen Freeman, Bedfordshire, England

[73] Assignee: Crosfield Electronics Ltd., England

[21] Appl. No.: 650,547

[22] Filed: Feb. 5, 1991

[30] Foreign Application Priority Data

Feb. 5, 1990 [GB] United Kingdom ............... 9002479

[51] Int. Cl.$^5$ ............................................. G09G 5/08
[52] U.S. Cl. ..................... 340/709; 340/712; 340/728; 340/747
[58] Field of Search ............... 340/706, 709, 710, 711, 340/712, 721, 723, 724, 726, 728, 730, 745; 395/141, 142, 143

[56] References Cited

U.S. PATENT DOCUMENTS

| | | | |
|---|---|---|---|
| 4,680,429 | 7/1987 | Murdock et al. ............... | 340/706 |
| 4,707,845 | 11/1987 | Krein et al. ..................... | 340/706 |
| 4,710,761 | 12/1987 | Kapur et al. .................... | 340/721 |
| 4,714,918 | 12/1987 | Barker et al. ................... | 340/726 |
| 4,829,470 | 5/1989 | Wang ............................... | 340/721 |
| 4,899,138 | 2/1990 | Araki et al. ..................... | 340/712 |
| 4,907,174 | 3/1990 | Priem ............................... | 340/747 |
| 4,992,630 | 2/1991 | Mletzko .......................... | 340/711 |

OTHER PUBLICATIONS

"Lisa Draw"; Apple Computer, Inc.; copyright 1984; pp. 69-83 and 136-149.

*Primary Examiner*—Richard Hjerpe
*Attorney, Agent, or Firm*—Sughrue, Mion, Zinn, Macpeak & Seas

[57] ABSTRACT

A method and apparatus for generating an electronic representation of a boundary, particularly for use in generating an outline around a displayed image. The apparatus comprises a screen (30) and a control system (1,2). The control system enables a cursor to be moved to spaced points along the boundary and determines the coordinates of the boundary by interpolating straight lines between adjacent points. The control system also permits at least part of the boundary to be defined in a continuous drawing mode in which the cursor is moved continuously along the boundary, the coordinates of the successive cursor positions being determined.

11 Claims, 3 Drawing Sheets

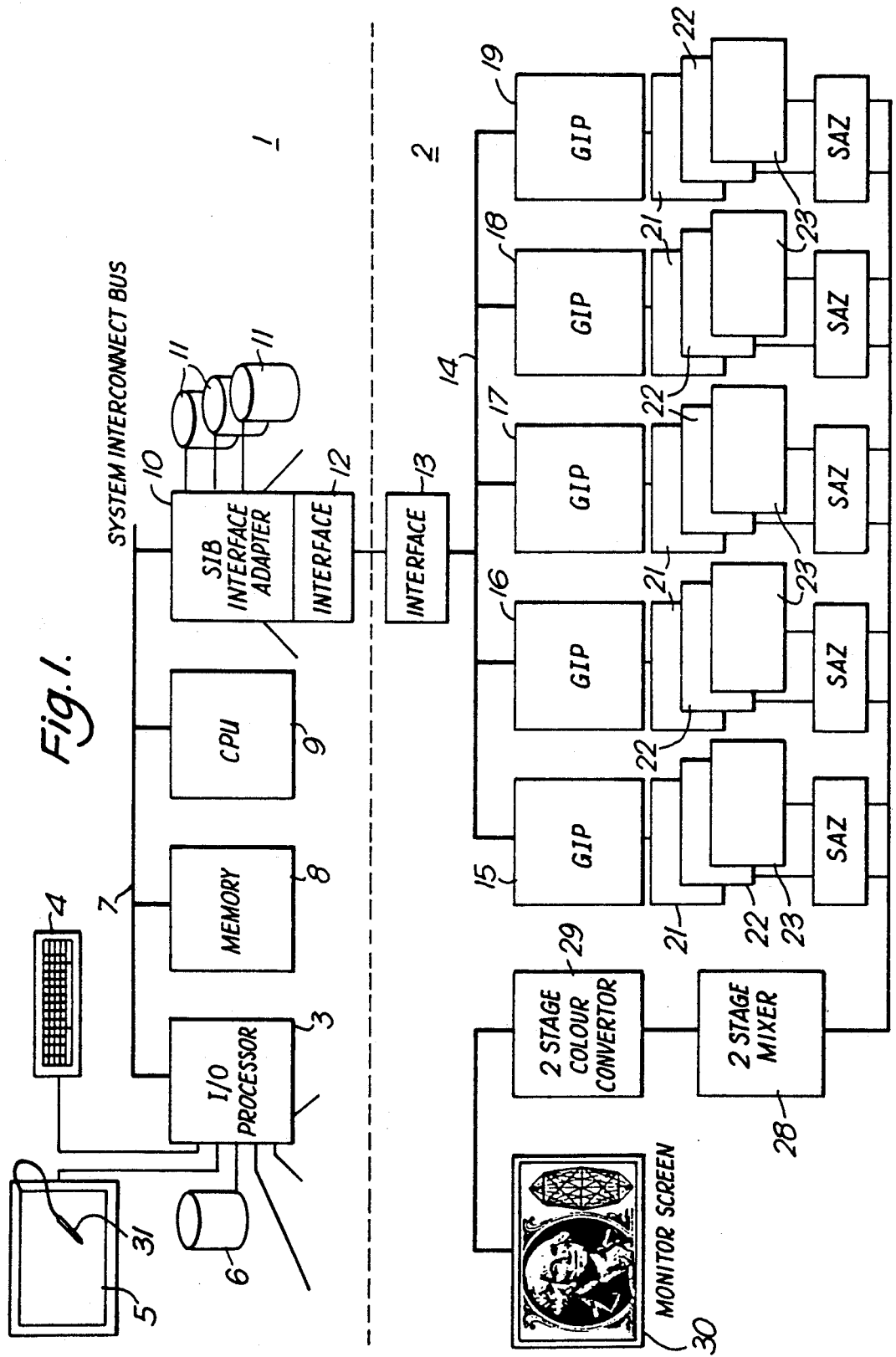

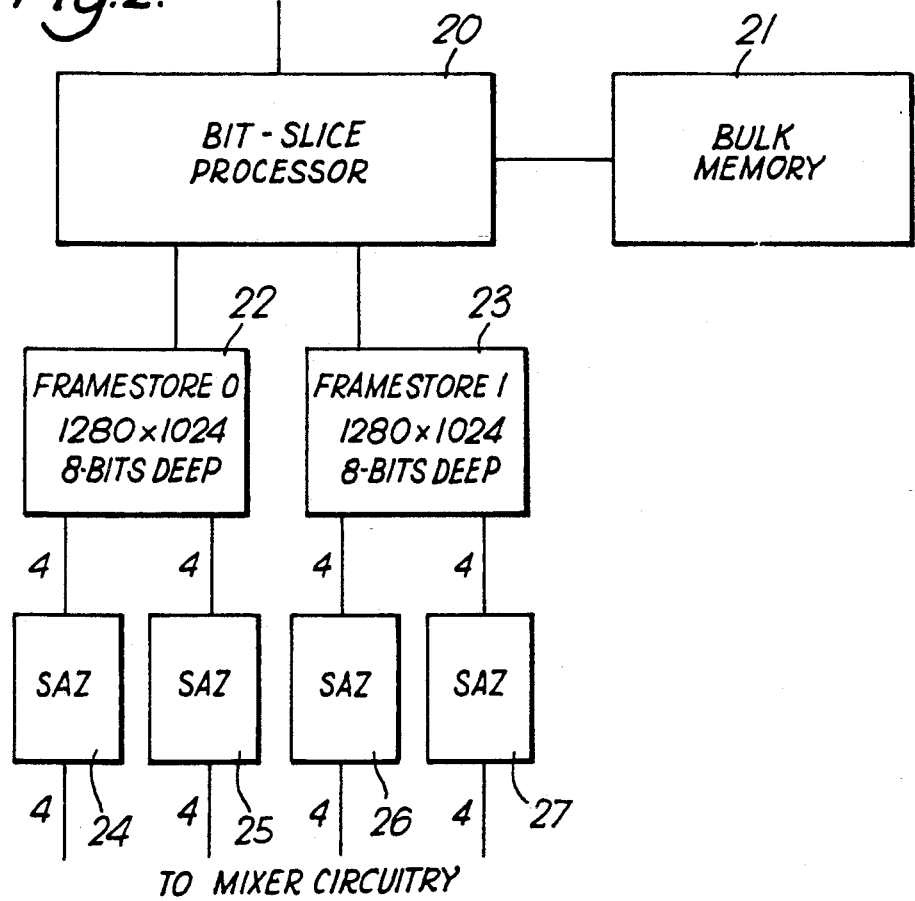
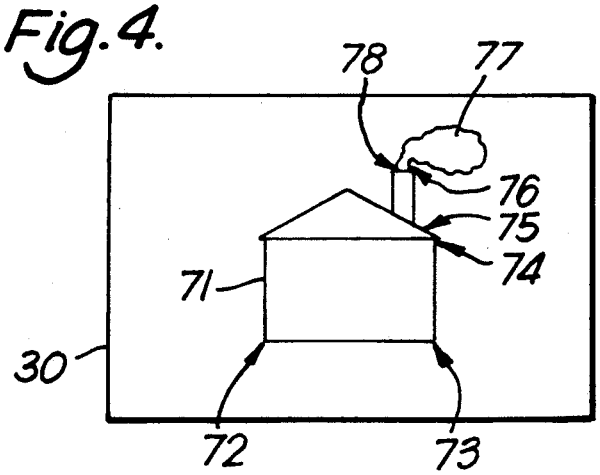

ELECTRONIC BOUNDARY GENERATION

FIELD OF THE INVENTION

The invention relates to methods and apparatus for generating an electronic representation of a boundary for example to define a portion of an image represented electronically by an array of pixels containing digital data defining the colour content of the image.

DESCRIPTION OF THE PRIOR ART

A conventional method is of the kind comprising moving a cursor about a screen display to spaced points along a desired boundary; determining the coordinates of the boundary by interpolating straight lines between the adjacent points; and displaying the interpolated straight lines. Such a method is hereinafter referred to as of the kind described.

Methods of the kind described are often used to "cut-out" portions of images represented electronically in order that those portions can be "pasted" elsewhere. The method effectively defines a number of vectors around the cut-out portion so as to generate a closed irregular polygon. This is acceptable when the cut-out portion has mostly straight line edges but it is very difficult to place many small straight lines around curved edges. The technique is also used where an area of an image is to be defined for treatment different from other areas, e.g to be coloured differently. In addition it can be used for "painting" lines directly.

SUMMARY OF THE INVENTION

In accordance with one aspect of the present invention, a method of the kind described is characterized in that at least part of the boundary can be defined in a continuous drawing mode in which the cursor is moved continuously along the boundary the coordinates of successive cursor positions being determined.

In accordance with a second aspect of the present invention, apparatus for generating an electronic representation of a boundary comprises a screen on which the boundary can be displayed; and control means for moving a cursor to spaced points along the boundary and for determining the coordinates of the boundary by interpolating straight lines between adjacent points and is characterized in that the control means permits at least part of the boundary to be defined in a continuous drawing mode in which the cursor is moved continuously along the boundary, the coordinates of the successive cursor postions being determined.

This invention improves upon the known point-to-point technique by permitting an additional, continuous drawing mode to be achieved in which the operator can effectively draw freehand along the desired boundary.

In order to switch between the continuous drawing mode and the point-to-point mode, the operator could activate an appropriate switch (for example with his free hand) but preferably where cursor movement is caused by relative movement of an indicating device over a detection plane, the continuous drawing mode is selected when the physical relationship between an indicating device and a detection plane satisfies predetermined conditions.

For example, the continuous drawing mode could be selected if the time for which the indicating device is at a particular coordinate exceeds a threshold. In another example, the continuous drawing mode may be selected if the pressure exerted by the indicating device on the detection plane exceeds a threshold. In a further example, the continuous drawing mode is selected if the pressure exerted by the indicating device on the detection plane exceeds a threshold and the time during which the indicating device is at a particular coordinate also exceeds a threshold. In one preferred example, the control means responds to the lifting of the indicating device off the detection plane to start "point-to-point" mode and responds to contact between them to start continuous drawing mode. This is particularly convenient since it allows the operator seamlessly to switch between modes without having to remove the indicating device from the detection plane or even moving the cursor from its current position on the image.

Typically an image is displayed on the screen while the boundary is created.

An example of a method and apparatus according to the present invention will now be described with reference to the accompanying drawings, in which:

FIG. 1 is a block diagram of the apparatus;

FIG. 2 is a block diagram of a graphics image processor of FIG. 1;

FIG. 4 illustrates an example of a screen display.

DETAILED DESCRIPTION OF AN EMBODIMENT

Figure 3:
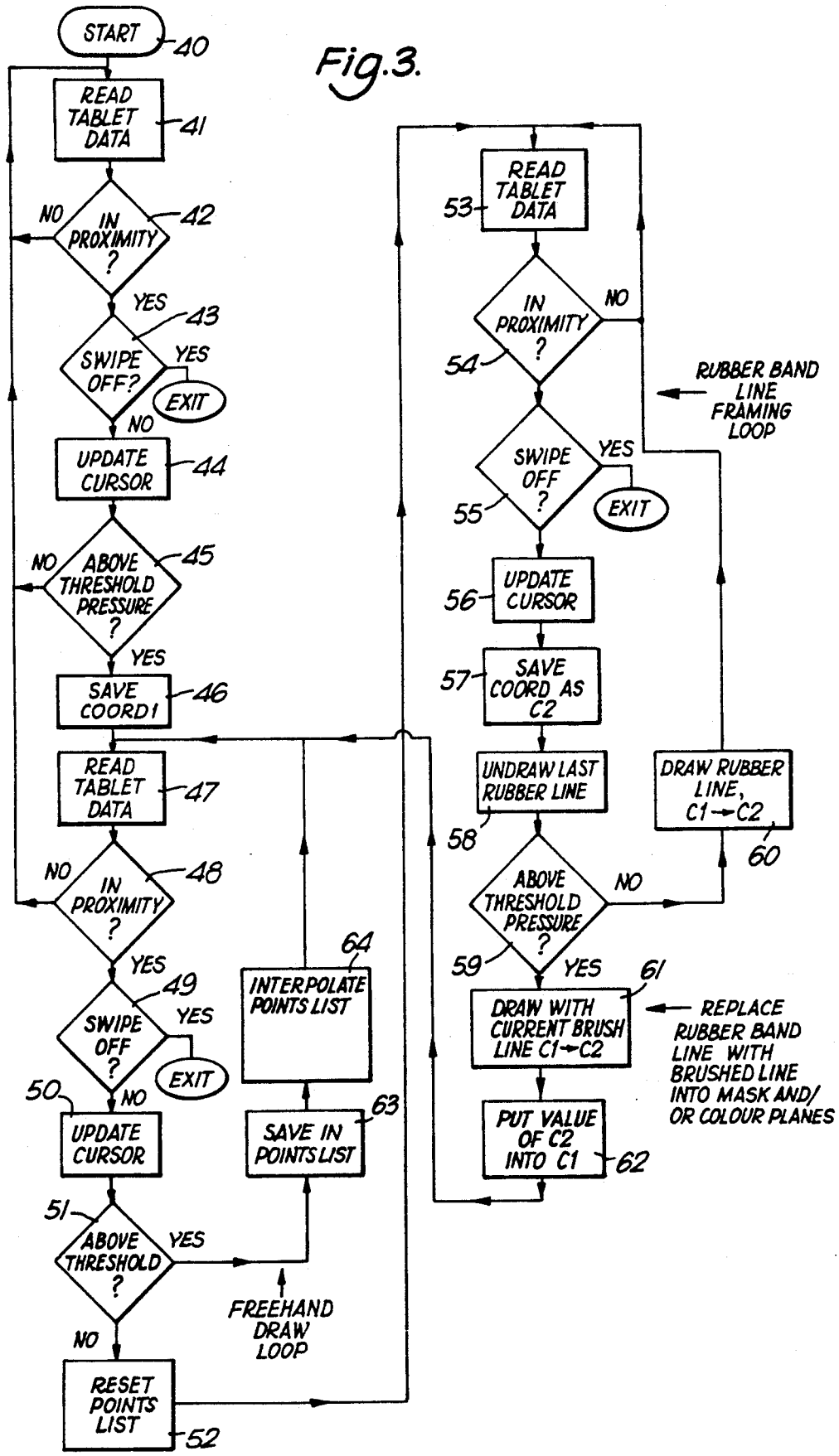
FIG. 3 is a flow diagram illustrating operation of the apparatus.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The programme that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to programme.

The graphics sub-system 2 comprises an interface 13 which connects the graphics part to the host the interface 13 being connected to a bus 14. The bus 14 is connected to five graphics image processors (GIPs) 15-19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component, the GIP 17 the yellow colour component and the GIP 18 the black colour component. If the image was represented by a different number of colour components, for example red, green and blue then only three of the GIPs would be needed. The advantage of providing the GIPs 15-18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1204 and is 8 bits deep. In the GIPs 15-18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24-27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15-18 with the data from each of the frame stores 23 associated with the GIPs 15-18 in accordance with the mask stored in the framestore 22 of the GIP 19. This mixer circuit which operates in two stages is described in more detail in EP-A-0344976.

The output from the mixer circuit 28 is fed to a two stage colour converter 29 which converts the four colour component data to three colour component data e.g. red, green and blue suitable for controlling the display on a monitor screen 30.

In use, images are stored on the high speed image disks 11 and these images may have been generated by scanning original transparencies or other representations or they may have been created electronically using an electronic paint brush. The host 1 causes relevant portions of these images to be "paged" in and out of the bulk memory 21 in the GIPs 15-18 and brush profiles to be loaded and unloaded from the bulk memory 21 in the GIP 19. The interface adaptor 10 has its own 68020 processor to allow it independently to control the disks 11. The GIPs 15-18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

This invention is concerned with defining an outline in an image displayed on the monitor 30. Initially, the operator enters an "outline" mode (step 40) and the host 1 reads from the tablet 5 the current coordinates of the pen 31 (step 41). The host then checks that the pen 31 is still in proximity (step 42), that is, whether the pen is in proximity to the tablet. For example, the pen will be in proximity if it is <5 mm from the tablet surface. If the pen is in proximity and if the current coordinates indicate that the pen 31 has been swiped off the tablet (step 43) the host exits from the vector cut-out mode.

If the pen 31 has not been swiped off and it is within the predetermined boundary area and on the tablet, the host 1 saves in its memory 8 the current coordinates of the pen and causes the cursor to be displayed on the monitor screen 30 (step 44). The host 1 also monitors the pressure with which the pen 31 is applied to the tablet 5 (step 45). If the pressure exceeds a threshold then the current coordinates are stored by the host 1 in a points list in the memory 8 (step 46). Typically, the tablet 5 produces 40 data packets per second. These contain x,y coordinates, pressure values, and "in proximity" flags. These are sent to the host 1 at a constant rate, irrespective of whether the pen changes position.

Steps 41-45 are repeated (as steps 47-51) and if it is found that the pressure of the pen 31 does not exceed the threshold pressure in step 51 processing switches to a "rubber band" mode in which the points list is reset (step 52) and a straight line anchored at coordinate 1 is displayed as if it were a rubber band "held" by the cursor at its other end. The host 1 performs this function by firstly performing steps 53-56 which correspond to the steps 41-44 and it will save the current pen coordinates (step 57). As the pen 31 is moved, the host 1 causes any previous rubber band or continuously drawn line to be erased from the framestore 22 (step 58) of the GIP 19 and instead, providing the threshold pressure is not exceeded (Step 59), causes the GIP 19 to store in its framstore 22 a straight line connecting the two stored coordinates (Step 60). This loop (steps 53-60) is repeated until the operator is satisfied with the position of the straight line displayed on the monitor screen 30 overlayed on the image, whereupon he presses down until the threshold is exceeded and the current brush is used to write the same straight line into the framestore 22 of the GIP 19 (step 61). The second coordinates are then reloaded as the first coordinates (step 62) and processing returns to step 47.

If at step 51 the threshold is exceeded then the system enters "continuous line drawing mode". In this mode the pen coordinates are continuously monitored and saved in the points list (step 63). The list is regularly reviewed (step 64) by the host 1 and the path of the pen 31 reduced to a series of small straight line segments chosen so that to the eye, the segmentation is not generally visible (i.e the line appears continuous).

As the segments are generated, the host 1 instructs the GIP 19 to display the segments by writing suitable data into the mask framestore 22 using the current brush.

Typically, this process will be used while the monitor is displaying an image which has been previously loaded from the disks 11 into the framestores 23 of the GIPs 15-18. In this way, the operator can trace around part of the displayed image for purposes of cut-out and the like.

FIG. 4 illustrates a very simple example in which an image of a house 71 is displayed on the monitor 30. It is assumed that the house 71 is displayed against a background and the intention is to outline that part of the image defining the house and the plume of smoke from the background. This is achieved using the technique of the invention by initially positioning the displayed cursor at a point 72, and then lifting the pen and placing it at the point 73. This movement will be accompanied by a displayed "rubber band" line having one end anchored at 72 and the other end following the cursor. When the pen is pressed down at 73 a line connecting those two points will be drawn by the host 1 in the framestore 22. The pen is again lifted and then placed at the point 74 and a line will be drawn connecting those points. The pen is then positioned at a point 75 and again at a point 76 to cause straight lines to be drawn between each of those points. At this point, a more complex feature has to be traced out and the operator switches to continuous freehand drawing mode by increasing the pen pressure (step 51) and carefully drawing around the outline of the smoke 77 until the pen reaches the point 78 where it is lifted off and processing returns to the rubber band mode. This then continues point by point until the pen returns to the point 72. Once the outline has been created, the operator can indicate to the host that it is satisfactory and, if a cut-out operation is required, the mask framestore is filled with the outline and the cutout operation performed in a conventional manner.

I claim:

1. A method of generating an electronic representation of a boundary comprising the steps of: in a first mode, moving a cursor about a screen display to spaced points along a desired boundary; determining the coordinates of the boundary by interpolating straight lines between the adjacent points; and displaying the interpolated straight lines; and ion a second, continuous drawing mode, defining at least part of the boundary by continuously moving the cursor along the boundary of the coordinates of successive cursor positions being determined, wherein the movement of the cursor in the first and second modes so as to generate the boundary is controlled by moving an indicating device in a drawing region of a detection plane, and wherein the second, continuous drawing mode is selected when the pressure exerted by the indicating device in the drawing region on the detection plane satisfies predetermined conditions.

2. A method according to claim 1, wherein the second, continuous drawing mode is selected when the pressure exerted by the indicating device in the drawing region on the detection plane exceeds a threshold.

3. A method according to claim 2, wherein the threshold is zero pressure.

4. A method according to claim 1, wherein the second, continuous drawing mode is selected when the pressure exerted by the indicating device in the drawing region on the detection plane exceeds a threshold and the time at which the indicating device has remained at a current coordinate position within the drawing region of the detection plane exceeds a threshold.

5. A method according to claim 1, wherein an image is displayed while the boundary is created.

6. A method of generating an electronic representation of a boundary comprising the steps of: in a first mode, moving a cursor about a screen display to spaced points along a desired boundary; determining the coordinates of the boundary by interpolating straight lines between the adjacent points; and displaying the interpolated straight lines; and in a second, continuous drawing mode, defining at least part of the boundary by continuously moving the cursor along the boundary of the coordinates of successive cursor positions being determined, wherein the movement of the cursor in the first and second modes so as to generate the boundary is controlled by moving an indicating device within a drawing region of a detection plane, and wherein the second, continuous drawing mode is selected when the time at which the indicating device remains at a current coordinate position in the drawing region exceeds a threshold.

7. A method according to claim 6, wherein an image is displayed while the boundary is created.

8. An apparatus for generating an electronic representation of a boundary comprising: a screen for displaying the boundary; an indicating device and a detection plane including a drawing region, wherein movement of the indicating device across the detection plane causes corresponding movement of a cursor about the screen; and control means responsive to movement of the indicating device within the drawing region of the detection plane, being operable in a first mode to move the cursor about the screen to spaced points along a desired boundary, to determine the coordinates of the boundary by interpolating straight lines between the adjacent points, and to display the interpolated straight lines; and in a second, continuous drawing mode to define at least part of the boundary by continuously moving the cursor along the boundary and to determine the coordinates of successive cursor positions, wherein the control means selects the second, continuous drawing mode when the pressure exerted by the indicating device in the drawing region on the detection plane satisfies predetermined conditions.

9. An apparatus according to claim 8, wherein the control means comprises comparison means for comparing said pressure with a threshold and for selecting the second, continuous drawing mode when the pressure exceeds said threshold.

10. An apparatus according to claim 8, wherein said control means monitors the time at which said indicating device remains at a current coordinate within the drawing region of the detection plane, said second, continuous drawing mode only being selected when said monitor time exceeds a threshold.

11. An apparatus for generating an electronic representation of a boundary comprising: a screen for displaying the boundary; an indicating device and a detection plane including a drawing region, wherein movement of the indicating device across the detection plane causes corresponding movement of a cursor about the screen; and control means responsive to movement of the indicating device within the drawing region of the detection plane, the control means being operable in a first mode to move the cursor about the screen to spaced points along a desired boundary, to determine the coordinates of the boundary by interpolating straight lines between the adjacent points, and to display the interpolated straight lines, and operable in a second, continuous drawing mode to define at least part of the boundary by continuously moving the cursor along the boundary and to determine the coordinates of successive cursor positions, wherein the control means monitors the time at which said indicating device is at a current coordinate position within the drawing region of the detection plane and selects said second, continuous drawing mode when said monitored time exceeds a threshold.

* * * * *